United States Patent [19]

Arisawa et al.

[11] Patent Number: 4,646,309
[45] Date of Patent: Feb. 24, 1987

[54] DYE LASER

[75] Inventors: Takashi Arisawa; Yoichiro Maruyama; Koreyuki Shiba, all of Ibaraki; Toshio Niwa, Kanagawa; Masaharu Kaneko, Kanagawa; Hitoshi Ono, Kanagawa, all of Japan

[73] Assignees: Japan Atomic Energy Research Institute; Mitsubishi Chemical Industries Limited, both of Tokyo, Japan

[21] Appl. No.: 540,015

[22] Filed: Oct. 7, 1983

[30] Foreign Application Priority Data

Oct. 15, 1982 [JP] Japan ................. 57-180694

[51] Int. Cl.$^4$ ............................................. H01S 3/20
[52] U.S. Cl. ..................................................... 372/53
[58] Field of Search .................. 372/51, 53; 544/7, 63

[56] References Cited

U.S. PATENT DOCUMENTS 4,103,257  7/1978  Hammond et al. ............... 372/53
4,380,634  4/1983  Atkins ................................ 372/53
4,453,252  6/1984  Arisawa et al. ................... 372/53

Primary Examiner—William L. Sikes
Assistant Examiner—Robert E. Wise
Attorney, Agent, or Firm—Browdy and Neimark

[57] ABSTRACT

There is herein, disclosed a dye laser including a container for a dye solution and a pumping energy source coupled thereto, said dye solution containing a perimidone dye formula (I):

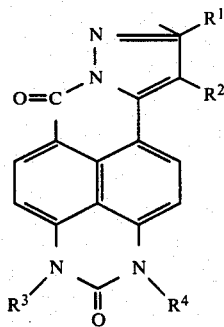

wherein $R^1$ is a hydrogen atom, an alkyl group, a trifluoromethyl group, an alkoxycarbonyl group, an alkoxycarbonylalkyl group, an aralkyl group or a phenyl group; $R^2$ is an optionally substituted alkoxycarbonyl group, a cyclohexyloxycarbonyl group, tetrahydrofuryloxycarbonyl group, an aryloxycarbonyl group, a benzyloxycarbonyl group, an acyl group, a cyano group or an optionally substituted carbamoyl group; $R^3$ and $R^4$ which may be the same or different are each a hydrogen atom, an alkyl group, an alkoxyalkyl group, an aralkyl group or an aryl group.

5 Claims, No Drawings

DYE LASER

BACKGROUND OF THE INVENTION

1. Field of the Invention

The present invention relates to a dye laser, and more particularly, to a dye laser that uses a perimidone dye as the active medium and emits laser light having an oscillation wavelength of 500 to 550 nm.

2. Description of the Prior Art

While many organic dyes have been proposed for use as active media in lasers, the use of perimidone dyes for emitting laser light having an oscillation wavelength of 500 to 550 nm has not been suggested.

SUMMARY OF THE INVENTION

One object of the present invention is to provide a novel perimidone dye for use as an active medium in lasers.

Another object of the invention is to provide a perimidone dye which emits laser light having an oscillation wavelength of 500 to 550 nm.

A further specific object of the invention is to provide a perimidone dye of formula (I) for use as an active medium in a laser emitting a light having an oscillation wavelength of 500 to 550 nm:

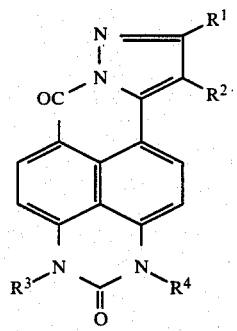
(I)

wherein $R^1$ is a hydrogen atom, an alkyl group, a trifluoromethyl group, an alkoxycarbonyl group, an alkoxycarbonylalkyl group, an aralkyl group or a phenyl group; $R^2$ is an optionally substituted alkoxycarbonyl group, a cyclohexyloxycarbonyl group, a tetrahydrofurfuryloxycarbonyl group, an aryloxycarbonyl group, a benzyloxycarbonyl group, an acyl group, a cyano group or an optionally substituted carbamoyl group; $R^3$ and $R^4$ which may be the same or different are each a hydrogen atom, an alkyl group, an alkoxyalkyl group, an aralkyl group or an aryl group.

These and other objects and advantages of the present invention will become apparent by reading the following description.

DETAILED DESCRIPTION OF THE INVENTION

The present invention relates to a dye laser, and more particularly to a dye laser which uses a perimidone dye as the active medium for emitting laser light having an oscillation wavelength of 500 to 550 nm.

The dye laser of the present invention uses a novel perimidone dye as the active medium, and emits a laser light having an oscillation wavelength of 500 to 550 nm. This laser can be used in isotope separation, and is particularly suited for uranium enrichment.

A laser, a kind of light amplifier, is capable of producing a monochromatic coherent light having high intensity and directionality. Among the various types of lasers, dye lasers are well developed lasers in which the active medium is a liquid and their principal components are a transparent container for a solution of a dyestuff and an optical resonator made of a pumping energy source optically coupled to that container. In order to avoid optical non-uniformity, the dye solution of a given concentration is usually passed through the circulation system containing the transparent container throughout the laser operation.

The pumping energy source emits light of high energy density necessary for operating the dye laser, and suitable sources include discharge tubes, flash lamps, gas lasers (e.g. $N_2$ and Ar lasers) and solid-state lasers (e.g. Nd-YAG laser). As a result of pumping, the dye molecule is excited to an upper energy state to cause radiation transition. The emitted light which propagates along the axis of the resonator is confined there for a sufficient period of time to cause a strong interaction with the excited dye molecule. If the number of the excited dye molecules exceeds that of the molecules in the ground state, stimulated emission occurs and the light is amplified in the resonator to produce an oscillating laser light.

One great advantage the dye laser has over solid-state lasers or gas lasers is that it can be operated with many kinds of organic dyes emitting fluorescent light at their own specific wavelengths which overlap to cover the entire visible spectrum. This brings about the possibility of designing a dye laser capable of light emission at any desired wavelength in the visible region. Another important feature of the dye laser is its tunability, i.e. the continuous adjustability of the output dye laser wavelength over a relative small region of wavelengths.

According to the present invention, a dye laser having an oscillating wavelength of 500 to 550 nm is provided, and it is characterized by using as an active medium a novel perimidone dye of formula (I) having high conversion efficiency:

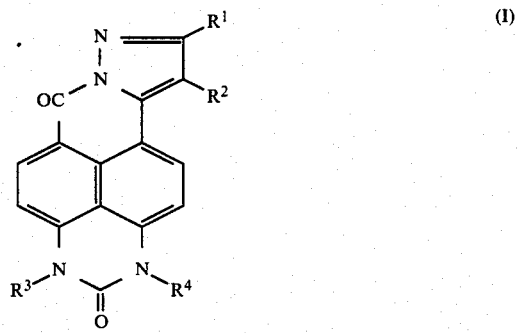
(I)

wherein $R^1$ is a hydrogen atom, an alkyl group, a trifluoromethyl group, an alkoxycarbonyl group, an alkoxycarbonylalkyl group, an aralkyl group or a phenyl group; $R^2$ is an optionally substituted alkoxycarbonyl group, a cyclohexyloxycarbonyl group, a tetrahydrofurfuryloxycarbonyl group, an aryloxycarbonyl group, a benzyloxycarbonyl group, an acyl group, a cyano group or an optionally substituted carbamoyl group; $R^3$ and $R^4$ which may be the same or different are each a hydrogen atom, an alkyl group, an alkoxyalkyl group, an aralkyl group or an aryl group.

Examples of the substituent represented by $R^1$ in formula (I) include a hydrogen atom, an alkyl group such as methyl, ethyl and propyl, butyl, hexyl or octyl; a trifluoromethyl group; an alkoxycarbonyl group such as methoxycarbonyl, ethoxycarbonyl, propoxycarbonyl or butoxycarbonyl; an alkoxycarbonylalkyl group such as methoxycarbonylmethyl, ethoxycarbonylmethyl, propoxycarbonylmethyl or butoxycarbonylmethyl; a phenyl group; and an aralkyl group such as benzyl or phenetyl. Examples of $R^2$ include an alkoxycarbonyl group such as methoxycarbonyl, ethoxycarbonyl, propoxycarbonyl, butoxycarbonyl, hexyloxycarbonyl or octyloxycarbonyl; an alkoxycarbonyl group substituted by alkoxy, alkoxyalkoxy or alkylamino, such as methoxyethoxycarbonyl, ethoxyethoxycarbonyl, propoxyethoxycarbonyl, butoxyethoxycarbonyl, methoxypropoxycarbonyl, methoxyethoxyethoxycarbonyl, ethoxyethoxyethoxycarbonyl, propoxyethoxyethoxycarbonyl, buthoxyethoxyethoxycarbonyl, dimethylaminoethoxycarbonyl or diethylaminoethoxycarbonyl; a cyclohexyloxycarbonyl group; a tetrahydrofurfuryloxycarbonyl group; a benzyloxycarbonyl group; an aryloxycarbonyl group such as tolyloxycarbonyl or phenoxycarbonyl; an acyl group such as acetyl, benzoyl or thienoyl; a cyano group; a carbamoyl group; and a substituted carbamoyl group such as phenylcarbamoyl, methylcarbamoyl, ethylcarbamoyl, propylcarbamoyl, butylcarbamoyl, dimethylcarbamoyl, diethylcarbamoyl or morpholinocarbamoyl. Examples of the substituents represented by $R^3$ and $R^4$ include a hydrogen atom; an alkyl group such as methyl, ethyl, propyl or butyl; an alkoxyalkyl group such as methoxyethyl, ethoxyethyl, methoxypropyl or ethoxypropyl; an aralkyl group such as benzyl or phenetyl; and an aryl group such as phenyl, p-methoxyphenyl, p-tolyl or p-chlorophenyl.

The perimidone dye of formula (I) may be produced by reacting a compound of formula (II):

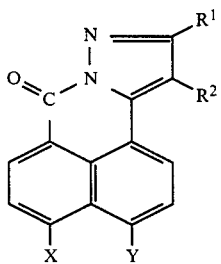
(II)

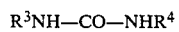

(wherein $R^1$ and $R^2$ are the same as defined above; X and Y which may be the same or different are each a halogen atom, an alkoxy group or an aryloxy group) with a urea of formula (III):

$$R^3NH\text{—}CO\text{—}NHR^4 \quad (III)$$

(wherein $R^3$ and $R^4$ are the same as defined above).

For use in the dye laser of the present invention, the perimidone dye of formula (I) is formulated as a solution having a concentration of $10^{-1}$ to $10^{-4}$ mols per liter. Water and various organic solvents may be used to form the solution. Suitable organic solvents include monovalent alcohols such as methanol, ethanol, isopropanol and butanol; polyvalent alcohols such as ethylene glycol; cellosolves such as methyl cellosolve and ethyl cellosolve; cyclic ethers such as tetrahydrofuran and dioxane; aromatic hydrocarbons such as benzene, toluene and xylene; phenols such as phenol and resorcin; alicyclic hydrocarbons such as cyclohexane and decalin; ketones such as acetone, butanone-2 and cyclohexanone; esters such as ethyl acetate, diethyl malonate, ethylene glycol diacetate and diethyl carbonate; halogenoalkanes such as chloroform; fluoroalcohols such as fluoroisopropyl alcohol; sulfoxides such as dimethylsulfoxide; and N,N-dialkylcarboxylic acid amides such as N,N-dimethylformamide and N,N-dimethylacetamide.

The present invention is hereunder described by working examples which are given here for illustrative purposes only and are by no means intended to limit the scope of the invention.

EXAMPLE 1

A dye having the formula:

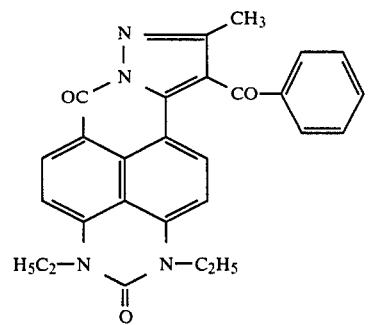

was dissolved in dioxane at a concentration of $1.0 \times 10^{-2}$ mol/liter. The solution was put into a quartz cell and the lasing characteristics of the dye were measured using a Nd-YAG pump laser emitting a laser light of 355 nm (third harmonics). Such measurement can be effected with an apparatus including the Nd-YAG laser, a dye laser proper, a monochromater, an oscilloscope, a power meter, a YAG output monitor, and oscillator-associated beam spliter, a total refecting mirror, a defraction grating, a quartz cell for containing the dye solution, and an output mirror. The maximum oscillating wavelength was 535 nm and the output was $4.8 \times 10^{-4}$ J.

EXAMPLES 2 to 29

Solutions of the dyes listed in Table 1 were prepared (for the solvents and the concentrations of the dyes, also see Table 1). The results of measurement of the oscillating wavelength are shown in Table 1.

TABLE 1

Dye formula:

$$\begin{array}{c} R^1 \\ \diagdown \\ N \\ | \\ OC \end{array} \begin{array}{c} R^2 \\ | \\ \diagdown \\ N \end{array} \text{—naphthalene—} \begin{array}{c} N-R^4 \\ | \\ O \end{array} \quad R^3-N$$

| Ex. No. | —R$^1$ | —R$^2$ | —R$^3$ | —R$^4$ | Solvent | conc. (mol/l) | max. oscillating wavelength |
|---|---|---|---|---|---|---|---|
| 2 | —CH$_3$ | —COOCH$_3$ | —CH$_3$ | —CH$_3$ | dioxane | $5 \times 10^{-3}$ | 524 |
| 3 | —CH$_3$ | —COOC$_4$H$_9$(iso) | —C$_4$H$_9$(n) | —C$_4$H$_9$(n) | dioxane | $5 \times 10^{-2}$ | 532 |
| 4 | —CH$_3$ | —COOC$_6$H$_{13}$(n) | —C$_2$H$_5$ | —C$_2$H$_5$ | dioxane | $1.5 \times 10^2$ | 588 |
| 5 | —CH$_3$ | —COOC$_4$H$_9$(iso) | —C$_2$H$_5$ | —C$_2$H$_5$ | N,N—dimethylformamide | $8 \times 10^{-3}$ | 526 |
| 6 | —CH$_3$ | —COO—⌬—H (cyclohexyl) | —C$_2$H$_5$ | —C$_2$H$_5$ | N,N—dimethylformamide | $6 \times 10^{-3}$ | 519 |
| 7 | —CH$_3$ | —H | —CH$_3$ | —CH$_3$ | N,N—dimethylformamide | $8 \times 10^{-3}$ | 529 |
| 8 | —CH$_3$ | —CO—Ph | —CH$_3$ | —CH$_3$ | N,N—dimethylformamide | $6 \times 10^{-4}$ | 534 |
| 9 | —CH$_3$ | —COO(CH$_2$)$_2$OC$_4$H$_9$(n) | —CH$_3$ | —CH$_3$ | dioxane | $1 \times 10^{-3}$ | 536 |
| 10 | —CF$_3$ | —COOC$_2$H$_5$ | —C$_4$H$_9$(n) | —C$_4$H$_9$(n) | dioxane | $3 \times 10^{-3}$ | 526 |
| 11 | —CH$_3$ | —COOCH$_2$—(tetrahydrofuranyl) | —C$_3$H$_7$(n) | —C$_3$H$_7$(n) | methyl ethyl ketone | $4 \times 10^{-3}$ | 525 |
| 12 | —CH$_3$ | —CO—Ph | —CH$_3$ | —C$_4$H$_9$(n) | dioxane | $4 \times 10^{-2}$ | 541 |
| 13 | —COOCH$_3$ | —COOCH$_3$ | —C$_4$H$_9$(n) | —C$_4$H$_9$(n) | N,N—dimethylformamide | $5 \times 10^{-4}$ | 521 |

TABLE 1-continued

Dye formula:

[Structure: naphthalene-based dye with substituents R¹, R², R³, R⁴ as shown]

| Ex. No. | $-R^1$ | $-R^2$ | $-R^3$ | $-R^4$ | Solvent | conc. (mol/l) | max. oscillating wavelength |
|---|---|---|---|---|---|---|---|
| 14 | $-CH_3$ | $-CON\begin{matrix}CH_3\\ -C_6H_5\end{matrix}$ | $-C_2H_5$ | $-C_2H_5$ | dioxane | $4 \times 10^{-4}$ | 520 |
| 15 | $-CF_3$ | $-CO-$(2-thienyl) | $-CH_3$ | $-CH_3$ | dimethylsulfoxide | $3 \times 10^{-4}$ | 526 |
| 16 | $-CH_3$ | $-CO-O-CH_2-C_6H_5$ | $-H$ | $-H$ | dimethylsulfoxide | $1 \times 10^{-4}$ | 512 |
| 17 | $-CF_3$ | $-COCH_3$ | $-CH_3$ | $-C_4H_9^{(n)}$ | dioxane | $1 \times 10^{-4}$ | 519 |
| 18 | $-CH_3$ | $-CONH-C_6H_5$ | $-CH_3$ | $-CH_3$ | dimethylsulfoxide | $1 \times 10^{-4}$ | 528 |
| 19 | $-C_6H_5$ | $-COOC_2H_5$ | $-C_2H_4OCH_3$ | $-C_2H_4OCH_3$ | dioxane | $3 \times 10^{-4}$ | 523 |
| 20 | $-C_6H_5$ | $-COOC_2H_5$ | $-CH_2-C_6H_5$ | $-CH_2-C_6H_5$ | chloroform | $4 \times 10^{-4}$ | 539 |

TABLE 1-continued

Dye formula:

| Ex. No. | —R$^1$ | —R$^2$ | —R$^3$ | —R$^4$ | Solvent | conc. (mol/l) | max. oscillating wavelength |
|---|---|---|---|---|---|---|---|
| 21 | —CH$_2$—(phenyl) | —COO—(phenyl) | —(phenyl) | —(phenyl) | dioxane | $3 \times 10^{-3}$ | 582 |
| 22 | —CH$_3$ | —CN | —CH$_3$ | —C$_4$H$_9^{(n)}$ | dioxane | $4 \times 10^{-2}$ | 530 |
| 23 | —CH$_3$ | —COO—CH$_2$—CH=CH$_2$ | —CH$_3$ | —CH$_3$ | dioxane | $3 \times 10^{-4}$ | 517 |
| 24 | —C$_6$H$_{13}^{(n)}$ | —COCH$_3$ | —CH$_3$ | —CH$_3$ | N,N—dimethylformamide | $4 \times 10^{-4}$ | 528 |
| 25 | —CH$_2$—COOCH$_3$ | —COOCH$_3$ | —C$_2$H$_5$ | —C$_2$H$_5$ | N,N—dimethylformamide | $3 \times 10^{-4}$ | 526 |
| 26 | —CH$_3$ | —COOC$_2$H$_5$N(C$_2$H$_5$)$_2$ | —CH$_3$ | —CH$_3$ | N,N—dimethylformamide | $1 \times 10^{-4}$ | 518 |
| 27 | —CH$_3$ | —CON(C$_2$H$_5$)$_2$ | —C$_2$H$_5$ | —C$_2$H$_5$ | N,N—dimethylformamide | $2 \times 10^{-4}$ | 524 |
| 28 | —CH$_3$ | —CONHC$_2$H$_5$ | —C$_2$H$_5$ | —C$_2$H$_5$ | N,N—dimethylformamide | $1 \times 10^{-4}$ | 531 |
| 29 | —CH$_3$ | —CO—N(morpholino) | —CH$_3$ | —C$_4$H$_9^{(n)}$ | N,N—dimethylformamide | $2 \times 10^{-4}$ | 530 |
| 30 | —CH$_3$ | —COOC$_6$H$_{13}^{(n)}$ | —H | —C$_6$H$_{13}^{(n)}$ | N,N—dimethylformamide | $1 \times 10^{-4}$ | 528 |
| 31 | —CH$_3$ | —CO—(phenyl) | —CH$_2$CH$_2$—(phenyl) | —CH$_2$CH$_2$—(phenyl) | dioxane | $3 \times 10^{-2}$ | 546 |

What is claimed is:

1. A dye laser including a container for a dye solution and a pumping energy source coupled thereto, said dye solution containing a perimidone dye of formula (I):

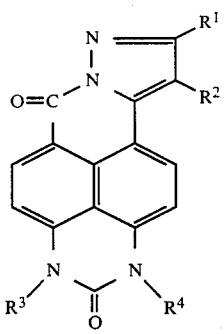

wherein $R^1$ is a hydrogen atom, an alkyl group, a trifluoromethyl group, an alkoxycarbonyl group, an alkoxycarbonylalkyl group, an aralkyl group or a phenyl group; $R^2$ is an optionally substituted alkoxycarbonyl group, a cyclohexyloxycarbonyl group, tetrahydrofurfuryloxycarbonyl group, an aryloxycarbonyl group, a benzyloxycarbonyl group, an acyl group, a cyano group or an optionally substituted carbamoyl group; $R^3$ and $R^4$ which may be the same or different are each a hydrogen atom, an alkyl group, an alkoxyalkyl group, an aralkyl group or an aryl group.

2. A dye laser according to claim 1 wherein the dye solution contains $10^{-1}$ to $10^{-4}$ mols of the perimidone dye per liter.

3. A dye laser according to claim 1 which has an oscillating wavelength range of 500 to 550 nm.

4. A dye solution for use in conjunction with a dye laser, said solution consisting essentially of a dye and a solvent therefore, said dye being of the formula (I):

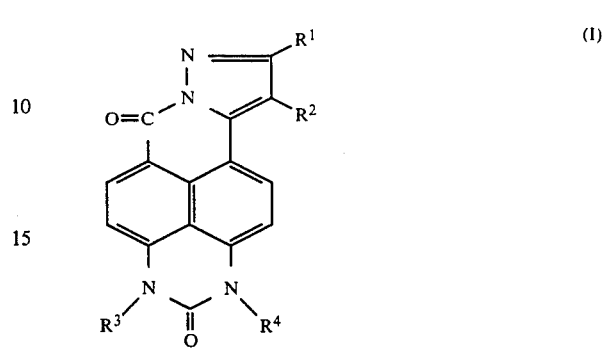

wherein $R^1$ is a hydrogen atom, an alkyl group, a trifluoromethyl group, an alkoxycarbonyl group, an alkoxycarbonylalkl group, an aralkyl group or a phenyl group; $R^2$ is an optionally substituted alkoxycarbonyl group, a cyclohexyloxycarbonyl group, tetrahydrofurfuryloxycarbonyl group, an aryloxycarbonyl group, a benzyloxycarbonyl group, an acyl group, a cyano group or an optionally substituted carbamoyl group; $R^3$ and $R^4$ which may be the same or different are each a hydrogen atom, an alkyl group, an alkoxyalkyl group, an aralkyl group or an aryl group.

5. A dye solution according to claim 4 containing $10^{-1}$ to $10^{-4}$ mols of the perimidone dye per liter.

* * * * *